(12) United States Patent
von Rhein

(10) Patent No.: US 9,678,203 B2
(45) Date of Patent: Jun. 13, 2017

(54) METHOD FOR DETERMINING AT LEAST ONE PARAMETER FOR THE PURPOSE OF CORRELATING TWO OBJECTS

(71) Applicant: Hella KGaA Hueck & Co., Lippstadt (DE)

(72) Inventor: Andreas von Rhein, Salzkotten (DE)

(73) Assignee: Hella KGaA Hueck & Co., Lippstadt (DE)

( * ) Notice: Subject to any disclaimer, the term of this patent is extended or adjusted under 35 U.S.C. 154(b) by 418 days.

(21) Appl. No.: 14/359,848

(22) PCT Filed: Nov. 21, 2012

(86) PCT No.: PCT/EP2012/073192
§ 371 (c)(1),
(2) Date: May 21, 2014

(87) PCT Pub. No.: WO2013/076122
PCT Pub. Date: May 30, 2013

(65) Prior Publication Data
US 2015/0091749 A1    Apr. 2, 2015

(30) Foreign Application Priority Data
Nov. 24, 2011    (DE) .......................... 10 2011 055 674

(51) Int. Cl.
*G01S 13/58*    (2006.01)
*G01S 7/02*    (2006.01)
(Continued)

(52) U.S. Cl.
CPC ............ *G01S 13/582* (2013.01); *G01S 7/023* (2013.01); *G01S 13/225* (2013.01);
(Continued)

(58) Field of Classification Search
CPC ...... G01S 13/582; G01S 13/225; G01S 7/023; G01S 13/931; G01S 2013/9332; G01S 2013/9325; G01S 2013/9342
(Continued)

(56) References Cited

U.S. PATENT DOCUMENTS 3,975,734 A * 8/1976 Payne ................. G01S 13/9029
342/160
4,114,153 A * 9/1978 Neidell ..................... G01S 3/80
342/108
(Continued)

FOREIGN PATENT DOCUMENTS

| EP | 1235079 A2 | 8/2002 |
| EP | 1457789 A2 | 9/2004 |
| WO | 0101166 A2 | 1/2001 |

OTHER PUBLICATIONS

Nakayama et al: "Novel variable spreading sequence length system for improving the processing speed of DS-UWB radar". Its Telecommunications, 2008. ITST 2008, 8th International Conference.
(Continued)

*Primary Examiner* — John B Sotomayor
(74) *Attorney, Agent, or Firm* — Husch Blackwell LLP

(57) ABSTRACT

A method for determining at least one parameter for the purpose of correlating two objects (10, 20), particularly the distance (r) and/or the relative speed (v) of the two objects (10, 20). A plurality of transmission pulse sequences following one after the after, each with at least one transmission pulse of an electromagnetic signal, forms a series of transmission pulse sequences. The duration of transmission of the individual transmission pulses is varied from transmission pulse sequence to transmission pulse sequence in order to reduce the susceptibility to interference in the determination of the at least one parameter.

8 Claims, 2 Drawing Sheets

(51) Int. Cl.
*G01S 13/22* (2006.01)
*G01S 13/93* (2006.01)

(52) U.S. Cl.
CPC ..... *G01S 13/931* (2013.01); *G01S 2013/9325* (2013.01); *G01S 2013/9332* (2013.01); *G01S 2013/9342* (2013.01)

(58) Field of Classification Search
USPC ....... 342/107, 108, 145, 146, 70–72, 82–88, 342/59, 159, 189
See application file for complete search history.

(56) References Cited

U.S. PATENT DOCUMENTS

| | | | | |
|---|---|---|---|---|
| 4,184,154 A * | 1/1980 | Albanese | ................ | G01S 13/42 342/107 |
| 5,212,489 A * | 5/1993 | Nelson | ................... | G01S 13/26 342/108 |
| 5,467,072 A * | 11/1995 | Michael | ................ | G01S 13/931 340/436 |
| 5,534,871 A * | 7/1996 | Hidaka | ................ | G01S 13/325 342/113 |
| 5,734,344 A * | 3/1998 | Yamada | ................ | G01S 13/345 342/107 |
| 6,121,915 A | 9/2000 | Cooper et al. | | |
| 7,768,445 B2 * | 8/2010 | Inaba | ...................... | G01S 7/021 342/112 |
| 8,108,147 B1 * | 1/2012 | Blackburn | ............. | G08G 1/166 235/454 |
| 9,310,470 B2 * | 4/2016 | Moriuchi | .................. | G01S 7/41 |
| 9,342,986 B2 * | 5/2016 | Dariush | ................ | G08G 1/166 |
| 2008/0046150 A1 * | 2/2008 | Breed | ................ | B60R 21/0134 701/45 |
| 2008/0231496 A1 * | 9/2008 | Sakamoto | ............... | G01S 7/354 342/59 |
| 2009/0096661 A1 * | 4/2009 | Sakamoto | ............... | G01S 7/021 342/92 |
| 2009/0309784 A1 * | 12/2009 | Natsume | ............... | G01S 13/426 342/189 |
| 2010/0019954 A1 * | 1/2010 | Mizutani | .................. | G01S 3/74 342/147 |
| 2010/0207806 A1 * | 8/2010 | Takahashi | ............. | G01S 13/106 342/109 |
| 2011/0156947 A1 * | 6/2011 | Kanamoto | ................ | G01S 3/74 342/107 |

OTHER PUBLICATIONS

Seung Goo Kang et al, "A distance measuring scheme based on repeated use of PN sequence" Communications (APCC), 2011 17th Asia-Pacific Conference on, IEEE, Oct. 2, 2011.

* cited by examiner

METHOD FOR DETERMINING AT LEAST ONE PARAMETER FOR THE PURPOSE OF CORRELATING TWO OBJECTS

CROSS REFERENCE

This application claims priority to International Application Number PCT/EP2012/073192, filed Nov. 21, 2012, which claims priority to German Patent Application No. 10 2011 055674.5, filed Nov. 24, 2011. Both of these documents are hereby incorporated by reference.

FIELD OF THE INVENTION

The present invention relates to a method for determining at least one parameter for the purpose of correlating two objects, and to a device for carrying out such a method.

BACKGROUND

Methods for determining at least one parameter for the purpose of correlating two objects are known in principle, and are frequently used today in vehicles to determine distances to other vehicles and surrounding objects. By way of example, methods are known to provide a so-called lane change assistance system. In this case, a monitoring of adjacent lanes is carried out by means of radar signals, and in this manner the approach of vehicles in the adjacent lane is detected. If a driver desires to execute a lane change, a warning can be relayed to the driver, for example by means of light signals, if the neighboring lane is not empty.

It is disadvantageous in known methods for determining parameters for the purpose of correlating two objects that, particularly when electromagnetic signals in the form of radar pulses are used, the system is susceptible to interference. This susceptibility to interference can particularly be attributed to interfering transmitters and/or sources of interference which are arranged inside the vehicle or outside of the vehicle. By way of example, it is possible that power supply devices of a vehicle, or radio towers positioned in the surroundings of a vehicle, produce interference signals which are wrongfully perceived by the determination method as an object. In such a case, a fault warning would be carried out—that is, the driver would be warned when making a lane change—although there is no vehicle driving past in the neighboring lane. This leads to a reduced acceptance of such systems when the driver of a vehicle uses the same. Such systems in principle are known, by way of example, in DE 10 2008 046 387 A1 as radar with an equivalent time sampling.

SUMMARY OF THE INVENTION

The problem addressed by the present invention is that of at least partially removing the disadvantages of known method devices described above. In particular, the problem addressed by the present invention is that of providing a method for determining at least one parameter for the purpose of correlating two objects, and a corresponding device, which reduce susceptibility to interference in the determination of at least one parameter, in a cost-effective and constructively simple manner.

Further features and details of the invention are found in the dependent claims, the description, and the drawings. Features and details which are described in the context of the method according to the invention also of course apply in the context of the device according to the invention, and vice-versa, such that reference is and/or can always be made in either of the individual aspects of the invention to the other aspect.

A method according to the invention serves the purpose of determining at least one parameter for the purpose of correlating two objects. This parameter is particularly the distance and/or the relative speed and/or relative angles of the two objects. In this case, such a method is used for a vehicle, by way of example, in the monitoring of an adjacent lane. In a method according to the invention, a plurality of transmission pulse sequences following one after the other is emitted, each having at least one transmission pulse of an electromagnetic signal, such that a series of transmission pulse sequences is formed. In this case, a sampling of the received signal can preferably follow a transmission pulse. The clocking of the sampling in this case preferably corresponds to the transmission clocking, such that the sampling duration is substantially the same as the duration of transmission. In the context of the invention, the electromagnetic signal is particularly a radar signal. The frequencies used in this case are particularly in the high-frequency range—for example, 24 GHz. In the receiving branch, this high frequency is downmixed, so the resulting difference frequency is limited with a low-pass filter to 100 kHz. Individual time signals in this case can be sampled at a frequency of 40 kHz. If three interlaced sequences—as A-, B-, and C-sequences—are used, by way of example, the effective sampling rate for a sequence drops to approx. 40 kHz/3—that is, 13.333 kHz.

In the context of the present invention, the term 'transmission pulse' should be taken to mean a duration of transmission over which an electromagnetic signal of a constant or changing frequency is emitted in a substantially constant manner. The duration of transmission is preferably in the range of microseconds, and particularly in the range of 25 microseconds. Each transmission pulse sequence has at least one such transmission pulse, and preferably two or more transmission pulses are collected in one transmission pulse sequence. Typically, an individual transmission pulse is indicated with a capital letter, such that a transmission pulse sequence can be indicated, by way of example, by three individual transmission pulses A, B, and C. All of the transmission pulse sequences together are continually repeated one after the other, such that a series of transmission pulse sequences following one after the other is formed as a result.

A method according to the invention is characterized in that the duration of transmission of the individual transmission pulses is varied from transmission pulse sequence to transmission pulse sequence in order to reduce the susceptibility to interference in the analysis of the method. In other words, a variation of the exact duration of transmission of the individual transmission pulses occurs insides a transmission pulse sequence. If a first transmission pulse sequence is emitted, then a variation of the transmission pulse is carried out such that all transmission pulses of this individual first transmission pulse sequence have the same duration of transmission. Next, a variation is made, such that the transmission pulses of the subsequent transmission pulse sequence in this series likewise have the same duration of transmission as each other, but these differ from the duration of transmission of the transmission pulses of the first transmission pulse sequence.

The variation by means of a method according to the invention described above can also be understood as intentional unsharpness in the sampling by means of electromagnetic signals. As such, this approach is in contrast with the conventional attempt of a person skilled in the art to achieve the most exact possible sampling and the sharpest possible frequency signal results. As, a result of the variation of the duration of transmission, an unsharpness is achieved, which can also be characterized as a so-called "jitter". This jitter leads to the fact that the result in the analysis of the reflected electromagnetic signals—that is, in the received, reflected signals—is slightly noisy in the method according to the invention. This has the result that, even though the exactness in the analysis of a method according to the invention is reduced, at the same time individual, particularly apparent interference peaks are substantially entirely suppressed and/or blurred by the noise. As such, interference peaks, as occur by way of example in the determination of a parameter for the purpose of correlating two objects, as a result of electromagnetic interference signals in the area, become blurry, so to speak. An active filtering-out and/or an active interpretation of such interference signals is then no longer necessary. As such, not only can the analysis of such a method be improved, and the difficulty thereof be reduced, but also there is no need to provide a filter for the purpose of filtering out such interference signals. In addition, it must be noted that, particularly with constant jitter inside a transmission pulse sequence, the phasing is not noisy between the interlaced A series and, for example, the demultiplexed B series. As such, the unsharpness produced by the jitter can again be reduced at least partially.

The series of transmission pulse sequences in a method according to the invention in this case preferably refers to 512 individual transmission pulse sequences, for example. A transmission pulse sequence can of course also be used in a series which is longer or shorter. In addition, a series of transmission pulse sequences can likewise be repeated periodically.

In the context of the present invention, the variation of the duration of transmission can be performed in different ways. In particular, a random variation or a prespecified variation of the duration of transmission is advantageous.

A method according to the invention can be implemented by each transmission pulse sequence having the same number of transmission pulses. This means that no variation occurs in the number of the transmission pulses from one transmission pulse sequence to the next. That is, if a transmission pulse sequence is designed as having three transmission pulses A, B, and C, for example, all transmission pulse sequences have this variation. As a result, it is possible that even simpler control and regulation are possible in the execution of a method according to the invention. In this case, the individual transmission pulses can be made on the same frequency, or can also have a frequency shift. This means that the individual transmission pulses are particularly emitted on different frequencies, wherein the frequency shift is identical for all transmission pulse sequences, or is substantially identical. As a result of a frequency shift, and moreover as a result of the provision of at least two transmission pulse sequences, it is possible to still further increase the exactness in the determination of a parameter for the purpose of correlating two objects. In particular, there is no need to rely on a plausibility test. Rather, a calculation can be carried out—for example of the distance and/or the relative speed of the two objects.

It can also be advantageous if each transmission pulse sequence in a method according to the invention has at least two transmission pulses. In this case, there are preferably three or even more transmission pulses. As a result of such a design, as explained above, an exact calculation of the distance and/or speed parameter is possible. In the case of a single pulse, this must be carried out using an estimation.

It can be a further advantage if the variation of the duration of transmission in a method according to the invention is produced by addition of a varied additional duration to a fixed base duration. The fixed base duration in this case can particularly be identical for all transmission pulse sequences, and also for all individual transmission pulses. This is a particularly large advantage for the regulation and/or control in a method according to the invention, as regards reduced complexity of the method. The addition of the varied additional duration has the result that only this part of the duration of transmission needs to be varied, and therefore even upon a malfunction—that is, if a deficiency occurs in the variation of the additional duration—the method according to the invention can still be carried out at least in the suboptimal range.

Likewise, it is advantageous if the additional duration in a method according to the invention is varied by means of a random generator, particularly between prespecified boundaries. The prespecified boundaries for the additional duration in this case are the range between +/−0.2 microseconds, by way of example. This can have the result that the boundaries lie in the range between +/−10%, and preferably in the range between +/−1% of the base duration of the duration of transmission of a transmission pulse. The random generators can be provisioned in the form of, by way of example, a white noise, a violet noise, a MASH process, a multi-stage sigma-delta modulator, or other known random generator mechanisms. The use of a random generator has the result that there is a high probably of the variation not being regular. The prevention of regularity in the variation of the duration of transmission has the result that the variation of the duration of transmission leads to a suppression and/or blurring of undesired interference peaks, in a desired manner.

Likewise, it is advantageous if the additional duration in a method according to the invention is varied via a prespecified variation profile, particularly between prespecified boundaries. This variant can of course be used as an alternative, or in combination with the use of a random generator. The specification of a variation profile in this case is preferably made such that it provides noise for the method in a non-symmetrical manner. The specification of one or even multiple variation profiles can serve the purpose of optimizing the method for specific interference signals. As such, depending on the actual driving situation, the variation profile can be matched to the actual driving situation, such that the most likely interference signals can be blurred with high probability by the corresponding, selected variation profile by a method according to the invention. This further reduces the complexity of regulation, and also renders unnecessary the active variation of the additional duration.

It can be a further advantage if the manner of the variation of the duration of transmission of the individual transmission pulses in a method according to the invention is modified after a plurality of series of transmission sequences. This can be carried out after 500 series, for example, and/or after more than 5 seconds. In this case, it may be that, by way of example, another random generator is selected, or, if variation profiles are specified—that is, jitter profiles—another profile of the variation is used as the basis. In this way, it is possible that there is an adaptation to different interference signals. In this way as well, it is possible to carry out an adaptation to different interference signals later in time, such that within a reasonable period of time of 10, 15, or 20 seconds, for example, a sampling for a highly varied range of interference signals, and/or an optimization with respect to a highly varied range of interference signals, can take place.

In addition, it is advantageous if the variation of the duration of transmission in a method according to the invention is produced by a variation of a sampling frequency for the individual transmission pulses. This leads to a particularly universal embodiment of the method according to the invention, wherein nevertheless a relatively deep intervention in the regulation of the transmission pulse variation is necessary. However, in this case, a substantially universal blurring of interference peaks—that is, particularly with respect to internal and external sources of interference—is possible.

As an alternative or in addition thereto, it is also possible for the variation of the duration of transmission in a method according to the invention to be produced by a variation of a switch converter frequency for the series of the transmission pulse sequences. In this case, this is a specific improvement with respect to interferences inside the vehicle—for example those emitted by an on-board power supply system. The variation of the switch converter frequency can be carried out with significantly simpler regulation techniques, but has lower optimization quality as regards external sources of interference.

In addition, the present invention includes the subject matter of a device for carrying out a method for determining at least one parameter for the purpose of correlating two objects, particularly the distance and/or the relative speed of the two objects, according to the present invention. Accordingly, a device according to the invention offers the same advantages as those which have been thoroughly explained in reference to a method according to the invention.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views. The terms "left," "right," "above" and "below" used herein refer to the orientation of the drawings where the reference numbers can be read normally.

FIG. 1 illustrates an embodiment of a method according to the invention. In this case, a first transmission pulse sequence F is transmitted, and consists of three individual transmission pulses $A_1$, $B_1$ and $C_1$. This transmission pulse sequence is continually repeated, although in FIG. 1 only the first repetition is shown, with the individual transmission pulses $A_2$, $B_2$ and $C_2$. The individual transmission pulse sequences F add together to make a series R of transmission pulse sequences F.

In the context of the present invention, the method according to the invention serves the purpose of modifying the individual transmission pulse sequences with respect to each other, by modifying the duration of transmission of the transmission pulses. By way of example, in the first transmission pulse sequence F, the individual durations of transmission are indicated with $T_a$ as the base duration for all transmission pulse sequences, and are the same for all transmission pulses. However, added to each of the base durations $T_a$ inside the first transmission pulse sequence F is one additional duration $dt_1$. In the second transmission pulse sequence F, a second additional duration $dt_2$ is added. The additional durations $dt_1$ and $dt_2$ are different from each other. They are particularly generated by the use of a prespecified variation profile and/or by the use of a random generator. As a result, the individual durations of transmission of the individual transmission pulses inside a transmission sequence F are identical, but differ from each other over the transmission pulse sequences as a whole. As such, noise and/or blur is produced, and thereby interference peaks in the form of singularly arising sources of interference in the analysis of the frequency band likewise become noisy, and can no longer trigger a false alarm.

Figure 1:
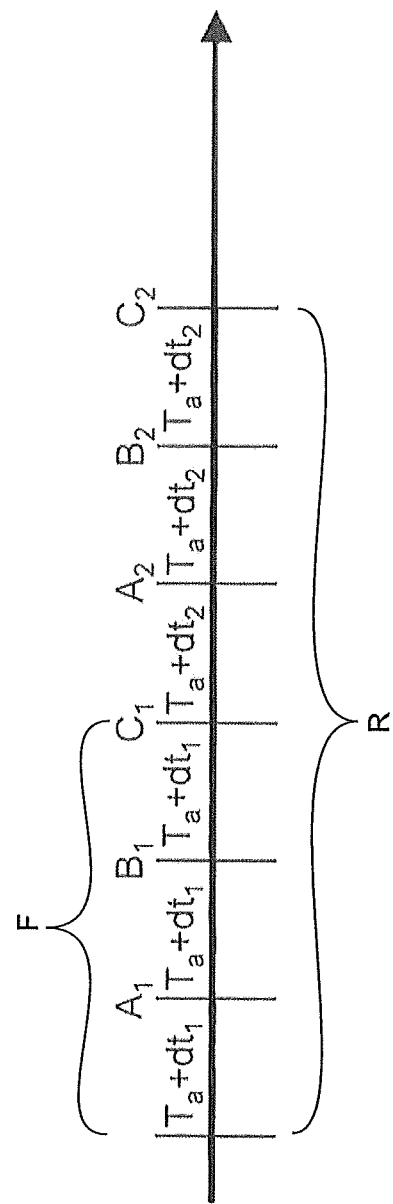
FIG. 1 shows an illustration of a series of transmission pulse sequences.
Figure 2:
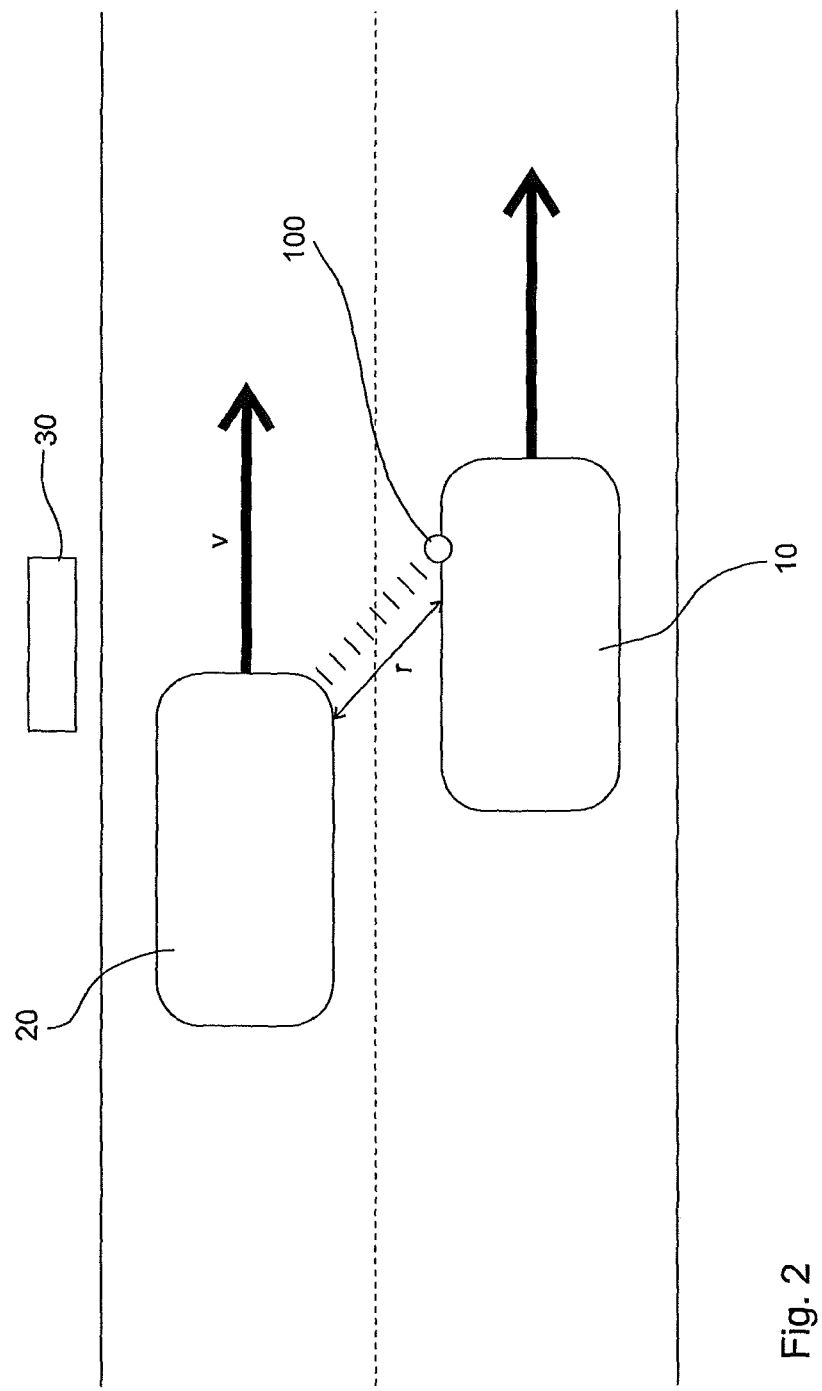
FIG. 2 shows a top view of a driving situation with the use of a method according to the invention.

FIG. 2 shows a situation in which a method according to the invention can be used for two objects 10 and 20. A first object 10 is a vehicle, by way of example, which is equipped with a monitoring device for the adjacent lane. For this purpose, a device 100 is included which is also set up to carry out the method according to the invention. To do this, electromagnetic signals are emitted. These are illustrated schematically in FIG. 2 in the form of individual transmission pulse sequences, as small dashes leaving the device 100. In the first object 10, an analysis of the distance r and/or the speed v of the second object 20 is carried out using the reflection and the analysis of these individual transmission pulses. In this case, these are particularly the relative distance and the relative speed between the two objects 10 and 20. A source of interference 30, illustrated schematically, is positioned next to the road surface. This can be the transmission tower of a cellular network, for example. This transmission tower as a source of interference 30 would lead, in devices 100 according to the prior art, to the fact that an individual peak can potentially produce a false response, even though there is not any second object 20 in the lane adjacent to the first object 10. With a method according to the invention, added noise in the results is used to achieve a state where this interference peak likewise blurs, and no false response is possible. The acceptance of such a system and/or such a device 100 is significantly higher, because false alarms can be largely ruled out for the driver.

The above description of the embodiments only discusses the present invention in the context of examples. Naturally, the features and details of embodiments can be freely combined with each other, to the extent this is technically reasonable, without departing from the scope of the present invention.

LIST OF REFERENCE NUMBERS 10 first object
20 second object
30 source of interference
100 device
r distance
v relative speed
A transmission pulse
B transmission pulse
C transmission pulse
F transmission pulse sequence
R series of transmission pulse sequences
dt additional duration
T base duration

The invention claimed is:

1. A method for determining at least one parameter for the purpose of correlating two objects, and particularly at least one of the distance, the relative speed, and relative angles of the two objects comprising the steps of:
   forming a series of transmission pulse sequences in which a plurality of transmission pulse sequences follow one after the after, each with at least one transmission pulse of an electromagnetic signal,
   varying the duration of transmission of the individual transmission pulses from transmission pulse sequence to transmission pulse sequence by addition of a varied additional duration to a fixed base duration in order to reduce the susceptibility to interference in the determination of the at least one parameter, wherein each transmission pulse within a given transmission pulse sequence has the same duration of transmission.

2. The method according to claim 1, wherein each transmission pulse sequence has the same number of transmission pulses.

3. The method according to claim 1, wherein each transmission pulse sequence has at least two transmission pulses.

4. The method according to claim 1, wherein the additional duration is varied by means of a random generator.

5. The method according to claim 1, wherein the additional duration is varied between prespecified boundaries.

6. The method according to claim 1, wherein the manner of the variation of the duration of transmission of the individual transmission pulses is changed after a plurality of series of transmission sequences.

7. The method according to claim 1, wherein the variation of the duration of transmission is produced by a variation of a sampling rate for the individual transmission pulses.

8. The method according to claim 1, wherein the variation of the duration of transmission is produced by a variation of a switch converter frequency for the series of transmission pulse sequences.

* * * * *